US012783666B2

(12) United States Patent
Moreno et al.

(10) Patent No.: US 12,783,666 B2
(45) Date of Patent: Nov. 3, 2026

(54) APPARATUS AND METHODS FOR EXTENDED RANGE MEASUREMENT OF MAGNETIC SIDE-CHANNELS

(71) Applicant: Palitronica Inc., Waterloo (CA)

(72) Inventors: Carlos Moreno, Waterloo (CA); Sebastian Fischmeister, Waterloo (CA)

(73) Assignee: Palitronica Inc.

( * ) Notice: Subject to any disclaimer, the term of this patent is extended or adjusted under 35 U.S.C. 154(b) by 629 days.

(21) Appl. No.: 17/886,906

(22) Filed: Aug. 12, 2022

(65) Prior Publication Data

US 2023/0046678 A1 Feb. 16, 2023

Related U.S. Application Data

(60) Provisional application No. 63/233,031, filed on Aug. 13, 2021.

(51) Int. Cl.

| | |
|---|---|
| ***G06F 21/56*** | (2013.01) |
| ***G01R 33/02*** | (2006.01) |
| ***G06F 21/80*** | (2013.01) |

(52) U.S. Cl.

CPC ........... *G06F 21/566* (2013.01); *G01R 33/02* (2013.01); *G06F 21/80* (2013.01); *G06F 2221/034* (2013.01)

(58) Field of Classification Search

CPC .. G06F 21/566; G06F 21/80; G06F 2221/034; G01R 33/02

See application file for complete search history.

(56) References Cited

U.S. PATENT DOCUMENTS

| | | | |
|---|---|---|---|
| 5,659,312 | A | 8/1997 | Sunter et al. |
| 5,778,030 | A | 7/1998 | Bruckert et al. |
| 6,342,350 | B1 | 1/2002 | Tanzi et al. |
| 6,469,049 | B1 | 10/2002 | Meyerhoff et al. |
| 6,620,621 | B1 | 9/2003 | Cohenford et al. |
| 7,188,258 | B1 | 3/2007 | Aggarwal et al. |
| 8,332,945 | B2 | 12/2012 | Kim |
| 8,522,052 | B1 | 8/2013 | Lesea |
| 8,548,219 | B2 | 10/2013 | Ortyn et al. |
| 8,892,903 | B1 | 11/2014 | Trimberger |
| 9,430,644 | B2 | 8/2016 | Aguayo-Gonzalez |

(Continued)

OTHER PUBLICATIONS

Carlos Moreno, Sebastian Fischmeister, and M. Anwar Hasan, Non-Intrusive Program Tracing and Debugging of Deployed Embedded Systems Through Side-Channel Analysis. LCTES ( 2013) (11 pages).

(Continued)

*Primary Examiner* — Zhe Liu

(74) *Attorney, Agent, or Firm* — Smart & Biggar LP

(57) ABSTRACT

Apparatus, systems, methods for measuring a side-channel is disclosed. The methods involve obtaining a first measurement of a magnetic field in a first range from the side-channel of the at least one electronic device; generating a version of the side-channel; obtaining a second measurement of the magnetic field in a second range from the version of the side-channel; and generating a composite measurement of the magnetic field from the side-channel of the at least one electronic device based on the first measurement and the second measurement. The first range includes a minimum threshold and at least a portion of the second range is less than the minimum threshold of the first range.

19 Claims, 4 Drawing Sheets

(56) References Cited

U.S. PATENT DOCUMENTS

| | | | |
|---|---|---|---|
| 9,444,618 B1 | 9/2016 | Trimberger et al. | |
| 10,007,786 B1 | 6/2018 | Bhatkar et al. | |
| 10,264,440 B2 | 4/2019 | Dishon et al. | |
| 10,395,032 B2 | 8/2019 | Keller et al. | |
| 10,430,263 B2 | 10/2019 | Polar Seminario | |
| 11,119,127 B2 | 9/2021 | Moreno | |
| 11,630,135 B2 | 4/2023 | Moreno | |
| 2003/0160154 A1 | 8/2003 | Arnold et al. | |
| 2004/0078690 A1 | 4/2004 | Kohashi | |
| 2007/0258898 A1 | 11/2007 | Ballinger et al. | |
| 2008/0021834 A1 | 1/2008 | Holla et al. | |
| 2008/0028468 A1 | 1/2008 | Yi et al. | |
| 2008/0113872 A1 | 5/2008 | Schuren et al. | |
| 2009/0012387 A1 | 1/2009 | Hanson et al. | |
| 2009/0322510 A1 | 12/2009 | Berger et al. | |
| 2010/0104191 A1 | 4/2010 | McGwire | |
| 2010/0237854 A1 | 9/2010 | Kumhyr et al. | |
| 2010/0281309 A1 | 11/2010 | Laurenti et al. | |
| 2010/0313270 A1 | 12/2010 | Kim et al. | |
| 2011/0183733 A1 | 7/2011 | Yoshida et al. | |
| 2011/0184580 A1 | 7/2011 | Kawamoto et al. | |
| 2011/0184585 A1 | 7/2011 | Matsuda et al. | |
| 2011/0185196 A1 | 7/2011 | Asano et al. | |
| 2011/0204889 A1* | 8/2011 | Nomura | H01M 10/48 324/252 |
| 2011/0234307 A1 | 9/2011 | Marinet et al. | |
| 2012/0029336 A1 | 2/2012 | Terada et al. | |
| 2012/0029718 A1 | 2/2012 | Davis | |
| 2012/0244145 A1 | 9/2012 | Sampson et al. | |
| 2012/0265487 A1 | 10/2012 | Yanine et al. | |
| 2013/0024382 A1 | 1/2013 | Dala et al. | |
| 2013/0318607 A1* | 11/2013 | Reed | G06F 11/3093 726/23 |
| 2014/0167704 A1 | 6/2014 | Lafontaine et al. | |
| 2014/0334653 A1 | 11/2014 | Luna | |
| 2014/0335043 A1 | 11/2014 | Chon et al. | |
| 2014/0371081 A1 | 12/2014 | Badve et al. | |
| 2015/0097729 A1 | 4/2015 | Subburaj et al. | |
| 2015/0279648 A1 | 10/2015 | Furtaw et al. | |
| 2015/0317475 A1* | 11/2015 | Aguayo Gonzalez | G06F 21/755 726/23 |
| 2015/0381364 A1 | 12/2015 | Al-Somani | |
| 2016/0041574 A1 | 2/2016 | Maitani et al. | |
| 2016/0117503 A1 | 4/2016 | Reed et al. | |
| 2016/0226892 A1 | 8/2016 | Sen et al. | |
| 2017/0060175 A1 | 3/2017 | Waugh | |
| 2017/0080249 A1 | 3/2017 | Brawn et al. | |
| 2017/0111069 A1 | 4/2017 | Dafesh et al. | |
| 2017/0149572 A1 | 5/2017 | Wallrabenstein | |
| 2017/0185770 A1 | 6/2017 | Guri et al. | |
| 2017/0234979 A1 | 8/2017 | Mathews et al. | |
| 2017/0343695 A1 | 11/2017 | Stetson et al. | |
| 2017/0351848 A1 | 12/2017 | Bakish | |
| 2018/0012020 A1* | 1/2018 | Prvulovic | G06F 21/552 |
| 2018/0137270 A1 | 5/2018 | Moreno et al. | |
| 2018/0261560 A1* | 9/2018 | Sarafianos | H10W 42/405 |
| 2018/0299464 A1 | 10/2018 | Li et al. | |
| 2019/0278945 A1* | 9/2019 | Sugahara | G06F 21/755 |
| 2020/0057120 A1* | 2/2020 | Belin | G01R 33/096 |
| 2021/0004461 A1* | 1/2021 | Guilley | H01L 23/576 |
| 2022/0100853 A1* | 3/2022 | Gehrer | G06F 21/56 |
| 2022/0108021 A1* | 4/2022 | Thibault | G06F 11/3062 |
| 2022/0137105 A1* | 5/2022 | Lill | G01R 19/22 324/119 |
| 2022/0187358 A1* | 6/2022 | Brochi | G06F 1/324 |
| 2023/0132919 A1* | 5/2023 | Millet | G01R 15/207 324/126 |
| 2023/0266368 A1* | 8/2023 | Marien | G01R 1/203 324/126 |

OTHER PUBLICATIONS

Mehari Msgna, Konstantinos Markantonakis, and Keith Mayes, The B-Side of side channel leakage: control flow security in embedded systems. T. Zia et al. (Eds.): SecureComm 2013, LNICST 127, pp. 288-304, 2013.

Shane S. Clark et al., WattsUpDoc: Power Side Channels To Nonintrusively Discover Untargeted Malware on Embedded Medical Devices. USENIX Workshop on Health Information Technologies (2013) (11 pages).

Eisenbarth et al., Building a Side Channel Based Disassembler. M.L. Gavrilova et al. (Eds.): Trans on Comput. Sci. X. LNCS 6340, pp. 78-99, 2010.

Kocher P., Jaffe J., Jun B., Differential Power Analysis. In: Wiener M. (eds) Advances in Cryptology—CRYPTO' 99. Lecture Notes in Computer Science, vol. 1666, pp. 388-397, 1999, Springer, Berlin, Heidelberg. https://doi.org/10.1007/3-540-48405-1_25 (10 pages).

Liu et al., On Code Execution Tracking via Power Side-Channel. CCS (2016), Oct. 24-28, pp. 1019-1031, Vienna, Austria (13 pages).

Callan, R., Zajic, A. and Prvulovic, M., Fase: finding amplitude-modulated side-channel emanations. In 2015 ACM/IEEE 42nd Annual Internationl Symposium on Computer Architecture (ISCA) Jun. 2015 (pp. 592-603). IEEE.

Belgarric, P., Bhasin, S.. Bruneau, N., Danger, J.L., Debande, N., Guilley, S., Heuser, A., Najm, S. and Rioul, O. Time-frequency analysis for second-order attacks. In International Conference on Smart Card Research and Advanced Applications, Springer, Cham, Nov. 2013. (pp. 108-122).

* cited by examiner

APPARATUS AND METHODS FOR EXTENDED RANGE MEASUREMENT OF MAGNETIC SIDE-CHANNELS

CROSS-REFERENCE TO RELATED APPLICATION

This application claims the benefit of U.S. Provisional Patent Application No. 63/233,031, filed on Aug. 13, 2021. The entire contents of U.S. Provisional Patent Application No. 63/233,031 is hereby incorporated by reference for all purposes.

FIELD

The embodiments described herein relate to the field of cybersecurity, and in particular, side-channel analysis of electronic devices.

BACKGROUND

Security and safety can be essential aspects of electronic and computer-based systems and in view of the ever-increasing connectivity of such systems. Electronic and computer-based systems can range from personal computers to embedded or cyber-physical devices in areas including but not limited to automotive, aerospace, military, industrial control systems, and critical infrastructure.

Run-time monitoring tools can be implemented in such systems to enforce security and safety properties during operation. However, monitoring security and safety properties poses unique challenges. The normal operation and functionality of such systems should not be disrupted by the monitoring tool. This is particularly important for safety critical system, real-time systems, and/or cyber-physical systems, in which any instrumentation or system running alongside the system itself can violate extra-functional requirements such as the timing of some operations. In addition, firmware reprogramming can bypass a monitoring tool if it runs alongside the monitored and vulnerable system. Furthermore, if malware runs on the same processor as the monitoring tool, then malware can "fake" behaviors that the monitoring tool will consider acceptable.

Some existing monitoring techniques are rooted in cryptology and based on side-channel analysis. In particular, such monitoring techniques can involve correlating instructions that a microprocessor is executing with side-effects of the microprocessor during execution, such as magnetic fields of the side-channel, power consumption, or electromagnetic emissions.

SUMMARY

The various embodiments described herein generally relate to apparatus and methods for measuring side-channels of electronic devices. The disclosed apparatus and methods can relate to monitoring the cybersecurity of an electronic device via a side-channel of the electronic device.

In accordance with an example embodiment, an apparatus for measuring a side-channel of at least one electronic device is provided. The apparatus includes a first sensor proximal to the side-channel and a second sensor connected in series with the first sensor. The first sensor is operable to generate a first measurement of a magnetic field in a first range from the side-channel of the at least one electronic device. The first range includes a minimum threshold. The second sensor is operable to generate a second measurement of the magnetic field in a second range from the side-channel of the at least one electronic device. At least a portion of the second range is less than the minimum threshold of the first range. A version of the side-channel is routed through the second sensor. The apparatus also includes a combiner connected to the first sensor and the second sensor for generating a composite measurement of the magnetic field from the side-channel of the at least one electronic device based on the first measurement and the second measurement.

In some embodiments, the version of the side-channel can be a current having an amplitude less than a maximum current limit of the second sensor.

In some embodiments, the first sensor can be a non-strapping sensor that measures magnetic fields from a source external to the first sensor; and the second sensor can be a strapping sensor that measures magnetic fields from a source that passes through the second sensor.

In some embodiments, the second sensor can have a higher resolution than the first sensor.

In some embodiments, the apparatus can further include a shunt device connected in parallel with the second sensor for generating the version of the side-channel being routed through the second sensor. The version of the side-channel can be a current-limited version of the side-channel.

In some embodiments, the shunt device can include a diode and a resistor.

In some embodiments, the apparatus can further include an amplifying converter connected to the side-channel for generating the version of the side-channel being routed through the second sensor. The version of the side-channel can be a voltage-amplified version of the side-channel.

In some embodiments, the amplifying converter can include a current-to-voltage amplifier connected to the side channel, a voltage limiter connected to an output of the current-to-voltage amplifier, and a resistor connected to the voltage limiter.

In some embodiments, the apparatus can further include a third sensor connected in series with the first sensor and the second sensor. The third sensor can be operable to generate a third measurement of the magnetic field in the first range from the side-channel of the at least one electronic device. At least a portion of the third range being less than the minimum threshold of the first range. A second version of the side-channel can be routed through the third sensor. The combiner can be further connected to the third sensor. The composite measurement can be further generated based on the third measurement.

In some embodiments, the third sensor can be a strapping sensor that measures magnetic fields from a source external to the third sensor.

In some embodiments, the third sensor can have a higher resolution than the first sensor.

In some embodiments, the third range and the second range are same.

In some embodiments, the second version of the side-channel can be a portion of the version of the side-channel.

In some embodiments, the apparatus can further include a DC block filter connected to the amplifying converter for generating the second version of the side-channel being routed through the third sensor.

In some embodiments, the apparatus can further include a first converter connected to the first sensor for digitizing the first measurement to provide a digitized first measurement; and a second converter connected to the second sensor for digitizing the second measurement to provide a digitized second measurement. The combiner can generate the composite measurement based on the digitized first measurement and the digitized second measurement.

In some embodiments, the combiner can include a selector for outputting either the first measurement or the second measurement based on a comparison of one or more of the first measurement or the second measurement with a pre-determined threshold.

In some embodiments, the combiner can superimpose the first measurement and the second measurement.

In some embodiments, the side-channel of the at least one electronic device can be a power connector of the at least one electronic device.

In accordance with another broad aspect, there is provided a method for measuring a side-channel of at least one electronic device. The method involves generating a first measurement of a magnetic field in a first range from the side-channel of the at least one electronic device; generating a version of the side-channel; generating a second measurement of the magnetic field in a second range from the version of the side-channel; and generating a composite measurement of the magnetic field from the side-channel of the at least one electronic device based on the first measurement and the second measurement. The first range can include a minimum threshold and at least a portion of the second range can be less than the minimum threshold of the first range.

In some embodiments, the method can involve positioning a non-strapping sensor proximal to the side-channel to generate the first measurement; and routing the version of the side-channel through a strapping sensor to generate the second measurement.

In some embodiments, the version of the side-channel can be a current having an amplitude less than a maximum current limit of the strapping sensor.

In some embodiments, the method can involve limiting a current from the side-channel that is routed to the strapping sensor.

In some embodiments, the method can involve converting a current from the side-channel to a voltage and amplifying the voltage to be routed to the strapping sensor.

In some embodiments, the method can involve generating a second version of the side-channel; and generating a third measurement of the magnetic field in a third range from the second version of the side-channel. At least a portion of the third range being less than the minimum threshold of the first range. The composite measurement of the magnetic field from the side-channel of the at least one electronic device can be further based on the third measurement.

In some embodiments, the second version of the side-channel can be a portion of the version of the side-channel.

In some embodiments, the method can involve digitizing the first measurement to provide a digitized first measurement; and digitizing the second measurement to provide a digitized second measurement. The composite measurement of the magnetic field from the side-channel of the at least one electronic device can be based on the digitized first measurement and the digitized second measurement.

In some embodiments, the method can involve comparing one or more of the first measurement or the second measurement with a pre-determined threshold; and selecting either the first measurement or the second measurement to provide the composite measurement.

In some embodiments, the method can involve superimposing the first measurement and the second measurement to provide the composite measurement.

In accordance with another broad aspect, an apparatus for measuring a side-channel of at least one electronic device is provided. The apparatus includes plurality of sensors and a combiner connected to the plurality of sensors. The plurality of sensors are operable to generate a plurality of measurements of a magnetic field from the side-channel of the at least one electronic device. At least two sensors of the plurality of sensors have different ranges than one another. The combiner is operable to generate a composite measurement of the magnetic field from the plurality of measurements.

In accordance with another broad aspect, a system for monitoring at least one electronic device is provided. The system includes a plurality of sensors operable to generate a plurality of measurements of a magnetic field from the side-channel of the at least one electronic device, a plurality of converters for digitizing the plurality of measurements to provide a plurality of digital measurements, and a processor. Each converter is connected to a corresponding sensor of the plurality of sensors. At least two sensors of the plurality of sensors have different ranges than one another. The processor is operable to: generate a composite measurement of the magnetic field from the plurality of digital measurements; determine whether the composite measurement matches an expected trace for the side-channel of the at least one electronic device; and generate a notification when the composite measurement does not match the expected trace for the side-channel of the at least one electronic device.

BRIEF DESCRIPTIONS OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
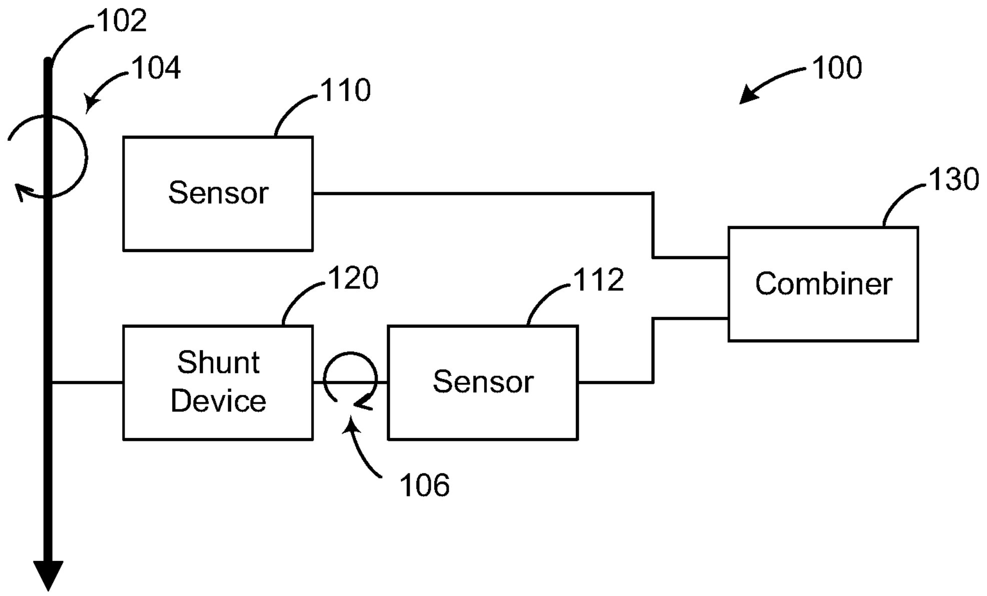
FIG. 1A illustrates an apparatus for measuring a side-channel of at least one electronic device, in accordance with at least one embodiment.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The various embodiments described herein generally relate to methods (and associated apparatus and systems configured to implement the methods) for measuring a side-channel of an electronic device, or a group of electronic devices (e.g., a local network of computing devices).

While some side-channel analysis techniques are used for the purpose of extracting secret data from a device (i.e., asset) to break the security system of the device, other side-channel analysis techniques are used for the purpose of monitoring the device to ensure safe and secure operation of the device. For example, side-channel analysis can be used as a runtime monitor to detect ransomware.

Side-channel analysis allows for the monitoring to be physically isolated from the asset. Furthermore, monitoring of the side-channel is less vulnerable to a remote attacker that may gain control over the asset.

Side-channel analysis techniques can involve measuring magnetic or electromagnetic side-effects and/or power consumption. Power consumption analysis typically involves using an inline resistor to measure a voltage drop proportional to the power consumption of a microprocessor, and correlating the measured power consumption to the operation of the microprocessor. Similarly, electromagnetic side-channel analysis can involve using an electromagnetic probe or antenna or the like to measure electromagnetic emanations.

Magnetic side-channel analysis can involve using a magnetic field sensor to measure the magnetic side-channel on a power cable of a graphics processing unit (GPU). Magnetic side-channel analysis is particularly advantageous for monitoring purposes because it is non-intrusive and does not disrupt the normal operation of the electronic device. However, because magnetic fields decrease drastically, conventional magnetic field sensors have limited effectiveness—even when located millimeters away from the source.

Sensors capable of measuring large magnetic fields generated by sources external to the sensor can be poor for measuring small magnetic fields due to insufficient resolution or accuracy. As a result, such sensors will measure mostly noise. Conversely, sensors capable of measuring small magnetic fields may saturate at moderately large magnetic fields. Some sensors, also known as "strapping sensors" have high sensitivity that is effective for measuring faint sources of magnetic fields. However, strapping sensors require the source of the magnetic field (i.e., wire carrying current) to be routed through or "strapped" into the sensor so that the source of the magnetic field is extremely close to the sensor. In such cases, the wire must be thin and will not be capable of withstanding a significantly higher current corresponding to a larger magnetic field. High current can damage such strapping sensors with high sensitivity.

Referring now to FIG. 1A, shown therein is an apparatus 100 for measuring a side-channel of an electronic device, in accordance with at least one embodiment. The apparatus can include a first sensor 110, a shunt device 120, a second sensor 112, and a combiner 130. In the example shown in FIG. 1A, the side-channel is a magnetic field 104 of a power connector 102 of the electronic device (not shown). The power connector 102 can be a power cable, power wire, or the like. Although only two sensors are shown in FIG. 1A, the apparatus 100 can include additional sensors.

The first sensor 110 can be positioned proximal to the side-channel. In some embodiments, the first sensor 110 is a non-strapping sensor. The first sensor 110 can generate a first measurement of the magnetic field 104. The first sensor 110 can measure large magnetic fields. For example, the first sensor 110 can obtain measurements within in a first range. In some embodiments, the first range can be defined by a minimum threshold value. In some embodiments, the first sensor 110 can obtain measurements on a first scale. The resolution of a sensor relates to the smallest change detectable by the sensor. The first sensor 110 can have a low resolution to measure large magnetic fields. That is, the measurement generated by the first sensor 110 can change in response large changes to the magnetic field and does not change in response to small changes to the magnetic field.

It should be noted that electric current, namely the power connector 102, is not routed through the first sensor 110. However, the first sensor 110 measures the magnetic field 104 produced by the electric current of the power connector 102.

Although the connection is not shown in FIG. 1A, the second sensor 112 can be connected in series to the first sensor 110. That is, the first sensor 110 and the second sensor 112 are inline. The second sensor 112 can generate a second measurement of the magnetic field 104. The second sensor 112 can measure small magnetic fields. Although the second sensor 112 is shown as being downstream of the first sensor 110, the first sensor 110 and the second sensor 112 can be in any order.

The second sensor 112 can obtain measurements within a second range. In some embodiments, the second range can be defined by a maximum threshold value. At least a portion of the second range is outside of the first range. That is, a least a portion of the second range is less than the minimum threshold value of the first range. In some embodiments, the entirety of the second range can be outside of the first range. That is, the maximum threshold value of the second range can be less than the minimum threshold value of the first range. In some embodiments, a portion of the second range can be within the first range. That is, the maximum threshold value of the second range can be greater than the minimum threshold value of the first range. In some embodiments, the second sensor 112 can obtain measurements on a second scale that is different from the first scale. In particular, the second scale can be smaller than the first scale. The second sensor 112 can have a high resolution to measure small magnetic fields. That is, the measurement generated by the second sensor 112 can change in response small changes to the magnetic field. Furthermore, the resolution of the second sensor 112 can be higher than the resolution of the first sensor 110. That is, the smallest change to the magnetic field that is detectable by the second sensor 112 is smaller than the smallest change detectable by the first sensor 110.

The second sensor 112 can have high sensitivity to measure small magnetic fields. To avoid damaging such a second sensor 112 having high sensitivity, the second sensor 112 can measure magnetic field 108 of a version of the side-channel, that is, a version of the same current that flows next to the first sensor 110. In some embodiments, the second sensor 112 can be a strapping sensor. Furthermore, the version of the side-channel can be routed through the strapping sensor.

In some embodiments, the version of the side-channel can be a current-limited version of the side-channel. For example, the strapping sensor can have a maximum current limit. The version of the side-channel routed through the strapping sensor can have a current that is less than the maximum current limit of the strapping sensor. In some embodiments, the current of the side-channel routed through the strapping sensor can be limited so that the amplitude is less than the maximum current limit of the strapping sensor. In other embodiments, the version of the side-channel can be a controlled copy of the current of the side-channel so that the amplitude of the controlled copy is less than the maximum current limit of the strapping sensor.

The shunt device 120 can be connected in parallel with the second sensor 112 to generate the version of the side-channel being routed through the second sensor 112. The shunt device 120 can generate a current-limited version of the current of the side-channel. It should be noted that for low current, namely currents that are less than the maximum current limit of the strapping sensor, the first sensor 110 and the second sensor 112, being connected in series, measure a magnetic field 106 generated by the exact same current. That is, the current-limited version is the same as the current of the side-channel.

Each of the first sensor 110 and the second sensor 112 can generate an output, such as a first measurement and a second measurement, respectively. The combiner 130 can be connected the first sensor 110 and the second sensor 112. The combiner 130 can generate a composite measurement of the magnetic field 104 based on the first measurement and the second measurement.

In some embodiments, output of one or more of the first sensor 110 or the second sensor 112 can be analog. When one or more outputs are analog, the apparatus 110 can include analog to digital converters (ADCs) for digitizing the analog outputs to provide digital outputs. For example, a first ADC can digitize an analog first measurement to provide a digitized first measurement and a second ADC can digitize an analog second measurement to provide a digitized second measurement. In such cases, the combiner 130 can generate the composite measurement based on the digitized first measurement and the digitized second measurement.

In some embodiments, the combiner 130 can include a selector to output either the first measurement or the second measurement based on a comparison of one or more of the first measurement or the second measurement with a pre-determined threshold. For example, the combiner 130 can compare the first measurement with a pre-determined threshold. If the first measurement is greater than the pre-determined threshold, the combiner 130 can output the first measurement. Otherwise, the combiner can output the second measurement. In another example, the combiner 130 can compare the second measurement with a pre-determined threshold. If the second measurement is less than the pre-determined threshold, the combiner 130 can output the second measurement. Otherwise, the combiner can output the first measurement.

In some embodiments, the combiner 130 can superimpose the first measurement and the second measurement. For example, the combiner 130 can add the first measurement and the second measurement together when the maximum threshold value of the second range is less than the minimum threshold value of the first range.

Figure 1B:
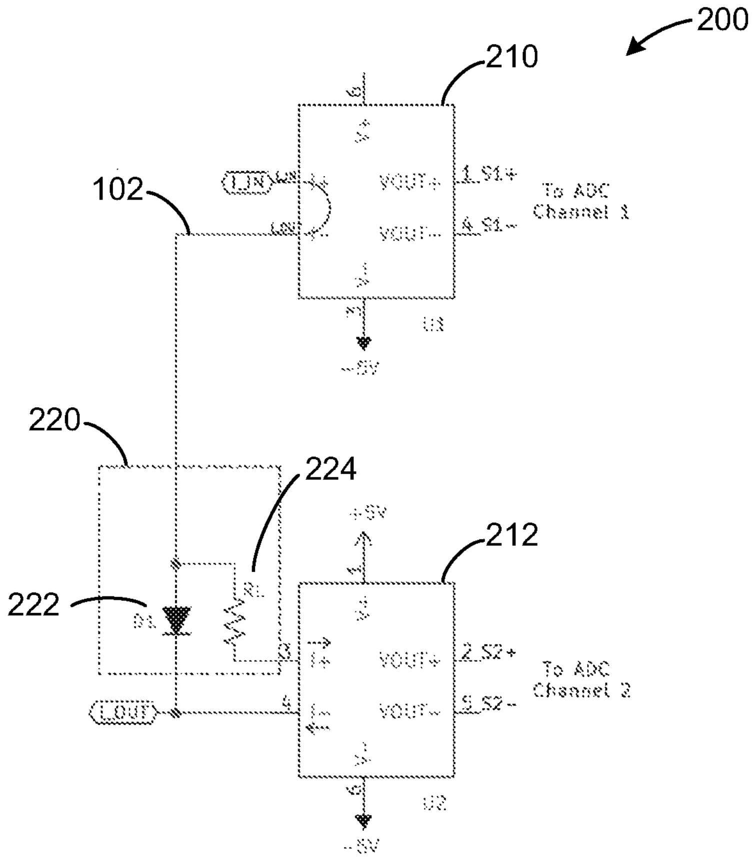
FIG. 1B illustrates another apparatus for measuring a side-channel of at least one electronic device, in accordance with at least one embodiment.

Referring now to FIG. 1B, shown therein is an apparatus 200 for measuring a side-channel of an electronic device, in accordance with at least one embodiment. The apparatus 200 has similarities to apparatus 100, and like features are identified using like reference characters, incremented by 100. For example, the first sensor 210 can measure magnetic field 104 in a first range and the second sensor 212 can measure magnetic field 106 in a second range.

As shown in FIG. 1B, the current in the side-channel is not connected to the pins (see e.g., I_IN and I_OUT) of the integrated circuit for the first sensor 110. Instead, the current in the side-channel merely flows next to the integrated circuit for the first sensor 110. After the first sensor 110, the current in the side-channel travels to the shunt device 220.

The shunt device 220 is connected in parallel to the second sensor 212. The shunt device 220 limits the current that flows to the second sensor 212 and absorbs any excess current. The shunt device 220 includes a diode 222 (see e.g., D1) connected to a resistor 224 (see e.g., RL). The diode 222 can be a high-current diode. The shunt device 220 can determine the current at which the maximum allowed voltage is produced between the pins of the second sensor 212 (see e.g., PIN 3, PIN 4).

For example, the second sensor 212 can have a maximum current limit of 100 milliamperes (mA) and an internal resistance of 0.25 Ohms (Ω). The resistor 224, which can be referred to as a limiting resistor, can produce a voltage drop equal to the forward voltage of diode 222 ($V_f$) when the current is 100 mA. To simplify the analysis, the forward voltage of the diode 222 can be assumed to remain constant under higher currents, such as currents above 100 mA. The diode 222 will absorb any extra current since the forward voltage remains constant. The current through the second sensor 212 can be determined based on Ohm's Law, namely, as voltage divided by the resistance. Given a forward voltage for diode 222 of 0.7V, the resistance of the resistor 224 can be determined based on Equation (1) below:

$$R_L = \frac{V_f}{I_{max}} - R_i = \frac{0.7\ \text{V}}{0.1\ \text{A}} - 0.25\ \Omega = 6.75\ \Omega$$

The power rating of the diode 222 can be calculated based the highest value of the source current (i.e. the current of the side-channel). However, the power rating of the resistor 224 can be calculated based only on the maximum current through the second sensor 212. The power rating of the resistor 224 can be determined based on Equation (2) below:

$$P_{RL} = I_{max}^2 R_L = 0.1^2 \times 6.75 = 0.0675W$$

Figure 2A:
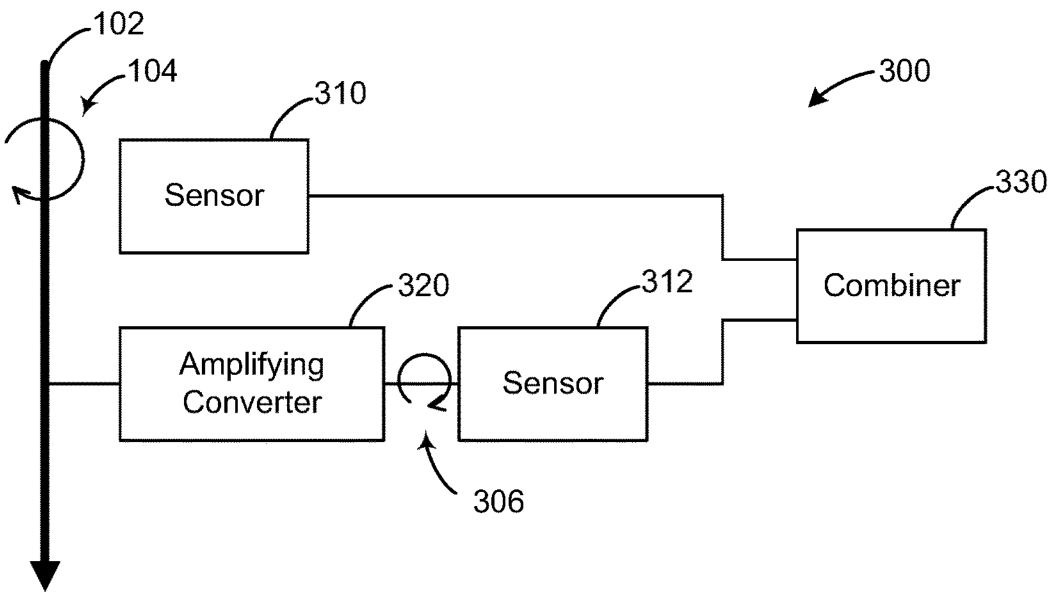
FIG. 2A illustrates another apparatus for measuring a side-channel of at least one electronic device, in accordance with at least one embodiment.

Referring now to FIG. 2A, shown therein is an apparatus 300 for measuring a side-channel of an electronic device, in accordance with at least one embodiment. The apparatus 300 has similarities to apparatus 100, and like features are identified using like reference characters, incremented by 200. For example, the first sensor 310 can measure magnetic field 104 in a first range, the second sensor 312 can measure magnetic field 306 in a second range, and the combiner 330 can generate a composite measurement based on outputs of the first sensor 310 and the second sensor 312.

Instead of the shunt device 120 of apparatus 100, apparatus 300 includes an amplifying converter 320. The amplifying converter 320 can be connected in parallel with the second sensor 312 to generate the version of the side-channel being routed through the second sensor 312. The amplifying converter 320 can generate a controlled copy of the current of the side-channel, namely, a voltage-amplified version of the side-channel. That is, the amplifying converter 320 can generate a voltage representative of the current of the side-channel. The voltage can be amplified to produce a current that is routed through the second sensor 312. As a result, the second sensor 312 measures the magnetic field 306 of the current of a voltage-amplified version of the side-channel. A potential disadvantage of apparatus 300 is that it can be more sensitive to noise. Apparatus 300 effectively amplifies very low currents (i.e., very faint signals) to produce the current that generates a magnetic field 306 that the second sensor 312 measures. Conversely, a potential advantage of apparatus 300 is that the amplifying converter 320 can result in a smaller voltage drop in the side-channel compared that of apparatus 100 and 200. Since monitoring the side-channel of the electronic device is intended to be a non-disruptive function, a large voltage drop may be undesirable, particularly if it disrupts the operation of the electronic device. As a result, the particular configuration of apparatus 300 can be designed to balance a low voltage drop in the side-channel and a sufficiently large current to reduce noise.

Figure 2B:
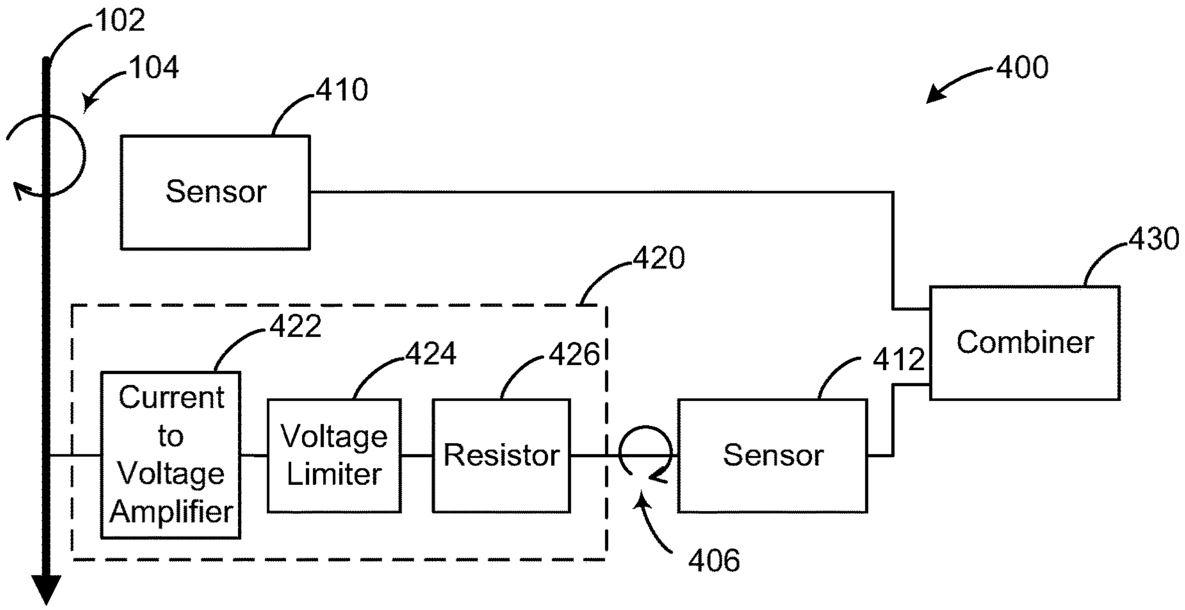
FIG. 2B illustrates another apparatus for measuring a side-channel of at least one electronic device, in accordance with at least one embodiment.

Referring now to FIG. 2B, shown therein is an apparatus 400 for measuring side-channel of an electronic device, in accordance with at least one embodiment. The apparatus 400 has similarities to apparatus 300, and like features are identified using like reference characters, incremented by 100. For example, the first sensor 410 can measure magnetic field 104 of the side-channel in a first range, the second sensor 412 can measure magnetic field 406 in a second range, and the combiner 430 can generate a composite measurement based on outputs of the first sensor 410 and the second sensor 412.

The amplifying converter 420 is connected in parallel to the second sensor 412 to generate the version of the side-channel being routed through the second sensor 412. As shown in FIG. 2B, the amplifying converter 420 includes a current-to-voltage amplifier 422 connected in series with the side-channel, a voltage limiter 424 connected to the output of the current-to-voltage amplifier 422, and a resistor 426 connected in parallel to the voltage limiter 424.

The current-to-voltage amplifier 422 includes an internal resistor (not shown in FIG. 2B) that can be selected to produce a very small voltage drop that is representative of the current of the side-channel. In particular, the internal resistor can be selected to produce a voltage drop that is less than the forward voltage ($V_f$) of diode 222 of apparatus 200. Current-to-voltage amplifier 422 amplifies the voltage drop of the internal resistor to produce a larger voltage. The voltage limiter 424 limits the amplified voltage that is applied to the second sensor 412. That is, the voltage limiter 424 produces a limited, amplified voltage that is routed through the second sensor 412. The voltage limiter 424 can be any circuit that limits the voltage within a pre-defined range. For example, the voltage limiter 424 can include but is not limited to a Zener diode, or an operational amplifier.

The resistor 426 converts the limited, amplified voltage produced by the voltage limiter 424 to a current that is routed through the second sensor 412. As a result, the second sensor 412 measures the magnetic field 406 of the current of a voltage-amplified version of the side-channel.

Figure 3:
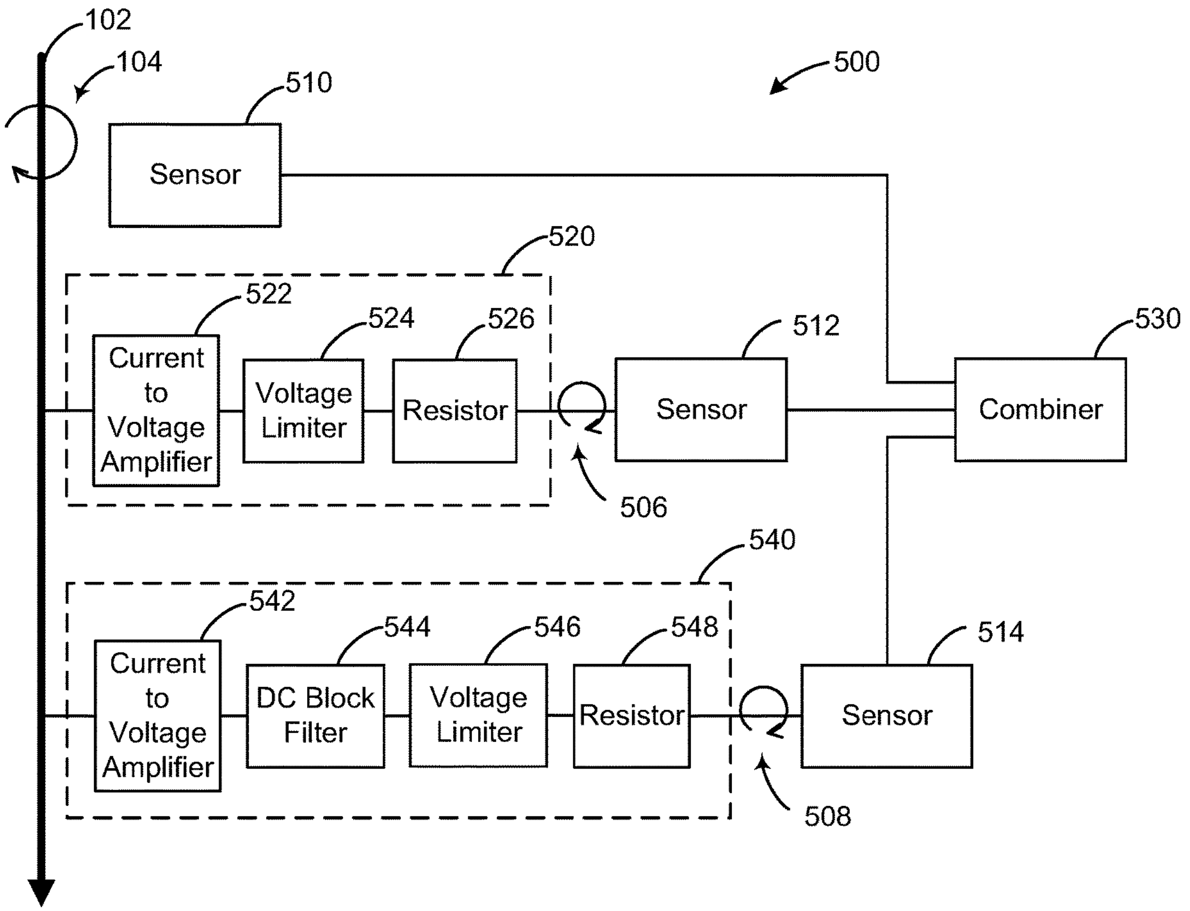
FIG. 3 illustrates another apparatus for measuring a side-channel of at least one electronic device, in accordance with at least one embodiment.

Referring now to FIG. 3, shown therein is an apparatus 500 for measuring side-channel of an electronic device, in accordance with at least one embodiment. The apparatus 500 has similarities to apparatus 400, and like features are identified using like reference characters, incremented by 100. For example, the first sensor 510 can measure magnetic field 104 of the side-channel in a first range and the amplifying converter 520, including a current-to-voltage amplifier 522, a voltage limiter 524, and a resistor 526, can generate a voltage-amplified version of the side-channel, similar to amplifying converter 420. The second sensor 512 measures magnetic field 506 of the voltage-amplified version of the side-channel in a second range, similar to second sensor 412.

Apparatus 500 also includes a third sensor 514. Although the connection is not shown in FIG. 3, the third sensor 514 can be connected in series to the first sensor 510 and the second sensor 512. That is, the first sensor 510, the second sensor 512, and the third sensor 514 are inline. The third sensor 514 can generate a third measurement of the magnetic field 104. The third sensor 514 can measure small variations to large magnetic fields. Although the third sensor 514 is shown as being downstream of the first sensor 510 and the second sensor 512, the sensors 510, 512, and 514 can be in any order.

The third sensor 514 can obtain measurements within a third range. In some embodiments, the third range can be defined by a maximum threshold value. At least a portion of the third range is outside of the first range. That is, a least a portion of the third range is less than the minimum threshold value of the first range. In some embodiments, the entirety of the third range can be outside of the first range. That is, the maximum threshold value of the third range can be less than the minimum threshold value of the first range. In some embodiments, a portion of the third range can be within the first range. That is, the maximum threshold value of the third range can be greater than the minimum threshold value of the first range. In some embodiments, the third range can be the same as the second range.

In some embodiments, the third sensor 514 can obtain measurements on a third scale that is different from the first scale. In particular, the third scale can be smaller than the first scale. In some embodiments, the third scale can be the same as the second scale. The third sensor 514 can have a high resolution to measure small magnetic fields. In particular, the resolution of the third sensor 514 can be higher than the resolution of the first sensor 510.

The third sensor 514 can have high sensitivity to measure small variations in the magnetic field 104. Similar to the second sensor 512, to avoid damaging the third sensor 514, the third sensor 514 can measure a second version of the side-channel. That is, a second version of the same current that flows next to the first sensor 510. In some embodiments, the third sensor 514 can be a strapping sensor. Furthermore, the second version of the side-channel can be routed through the strapping sensor by the amplifying converter 540.

In apparatus 500, the second version of the side-channel is a controlled copy of the current of the side-channel so that the amplitude of the controlled copy is less than the maximum current limit of the third sensor 514. In other embodiments, the second version of the side-channel can be a current-limited version of the side-channel.

The amplifying converter 540 is connected in parallel to the third sensor 514. Similar to amplifying converter 520, amplifying converter 540 generates a controlled copy of the current of the side-channel so that the amplitude of the controlled copy is less than the maximum current limit of the third sensor 514. Accordingly, the amplifying converter 540 includes a current-to-voltage amplifier 542 that is similar to current-to-voltage amplifier 522, a voltage limiter 546 that is similar to voltage limiter 524, and a resistor 548 that is similar to resistor 526.

In order for the third sensor 514 to measure small variations to a large magnetic field 104, the amplifying converter 540 also includes DC block filter 544 connected to the output of the current-to-voltage amplifier 542 to remove a portion of the side-channel that would otherwise saturate the third sensor 514. That is, the DC block filter 544 removes a portion of the side-channel to ensure that the magnetic field 508 to be measured by the third sensor 514 is within the third range. As a result, the second version of the side-channel being routed through the third sensor 514 can be a portion of the version of the side-channel being routed through the second sensor 512.

Although amplifying converters 520 and 540 are shown in FIG. 3 as being independent components, in other embodiments, amplifying converters 520 and 540 can share components. For example, amplifying converters 520 and 540 can have a common current-to-voltage amplifier 522, 542.

That is, current-to-voltage amplifier 542 can be omitted and instead, the DC block filter can be connected to the output of the current-to-voltage amplifier 522.

The combiner 530 can generate a composite measurement based on outputs of the first sensor 510, the second sensor 512, and the third sensor 514. The combiner 530 can superimpose the first measurement of large magnetic fields 104 and the third measurement of small variations 508 to the large magnetic fields. In some embodiments, the combiner 530 can further superimpose the second measurement of small magnetic fields 506. In some embodiments, the combiner 530 can include a selector to either output the second measurement or output the first measurement with the third measurement superimposed.

The apparatus 100, 200, 300, 400, or 500 can be implemented in a system to monitor at least one electronic device. The system can include a plurality of sensors operable to generate a plurality of measurements of a magnetic field from the side-channel of the at least one electronic device. At least two sensors of the plurality of sensors can have different ranges than one another. The system can include a plurality of converters, each converter can be connected to a corresponding sensor of the plurality of sensors. The plurality of converters can digitize the plurality of measurements to provide a plurality of digital measurements. A processor can generate a composite measurement of the magnetic field from the plurality of digital measurements and determine whether the composite measurement matches an expected trace for the side-channel of the at least one electronic device. The processor can generate a notification when the composite measurement does not match the expected trace for the side-channel of the at least one electronic device. The expected trace can correspond to a magnetic field trace that is representative of the proper operation of the at least one electronic device.

Figure 4:
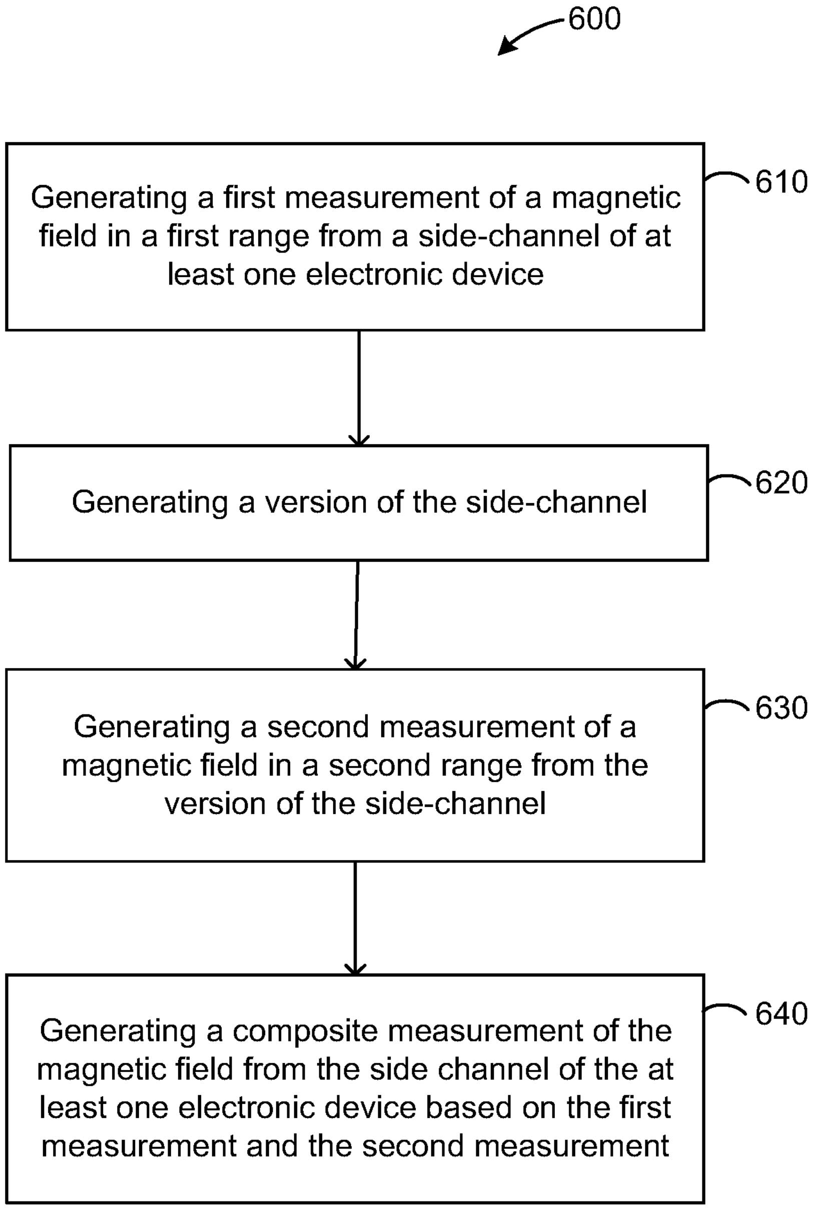
FIG. 4 illustrates a flowchart of a method for measuring a side-channel of at least one electronic device, in accordance with at least one embodiment.

Referring now to FIG. 4, an example method 600 for measuring a side-channel of at least one electronic device is shown in a flowchart diagram. To assist with the description of the method 600, reference will be made simultaneously to FIG. 1A to FIG. 3.

At 610, a first measurement of a magnetic field 104 in a first range is obtained from the side-channel 102 of the at least one electronic device. The first range includes a minimum threshold. In some embodiments, the first measurement can be obtained by positioning a non-strapping sensor, such as sensor 110, 210, 310, 410, or 510, proximal to the side-channel 104.

At 620, a version of the side-channel is generated. The version of the side-channel can be a current having a limited amplitude. In some embodiments, the version of the side-channel can be generated by limiting a current from the side-channel. In other embodiments, the version of the side-channel can be generated by converting a current from the side-channel to a voltage and amplifying the voltage.

At 630, a second measurement of a magnetic field in a second range, such as 106, 306, 406, or 506, is obtained from the version of the side-channel generated at 620. At least a portion of the second range is less than the minimum threshold of the first range. In some embodiments, the second measurement can be obtained by routing the version of the side-channel through a strapping sensor, such as sensor 112, 212, 312, 412, or 512.

At 640, a composite measurement of the magnetic field from the side-channel of the at least one electronic device is generated based on the first measurement and the second measurement. In some embodiments, the composite measurement can be generated by comparing one or more of the first measurement or the second measurement with a predetermined threshold. Based on the comparison, the either the first measurement or the second measurement can be selected to provide the composite measurement. In some embodiments, the composite measurement can be generated by superimposing the first measurement and the second measurement.

In some embodiments, the method can further involve generating a second version of the side-channel, obtaining a third measurement of the magnetic field in the first range, such as 508, from the second version of the side-channel. The composite measurement of the magnetic field from the side-channel of the at least one electronic device generated at 640 is further based on the third measurement. The second version of the side-channel can be a portion of the version of the side-channel generated at 620.

In some embodiments, the method can further involve digitizing the first measurement to provide a digitized first measurement; and digitizing the second measurement to provide a digitized second measurement. The composite measurement of the magnetic field from the side-channel of the at least one electronic device generated at 640 is based on the digitized first measurement and the digitized second measurement.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The terms “an embodiment,” “embodiment,” “embodiments,” “the embodiment,” “the embodiments,” “one or more embodiments,” “some embodiments,” and “one embodiment” mean “one or more (but not all) embodiments of the present invention(s),” unless expressly specified otherwise.

The terms “including,” “comprising” and variations thereof mean “including but not limited to,” unless expressly specified otherwise. A listing of items does not imply that any or all of the items are mutually exclusive, unless expressly specified otherwise. The terms “a,” “an” and “the” mean “one or more,” unless expressly specified otherwise.

It should be noted that terms of degree such as “substantially”, “about” and “approximately” when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording “and/or” is intended to represent an inclusive-or. That is, “X and/or Y” is intended to mean X or Y or both, for example. As a further example, “X, Y, and/or Z” is intended to mean X or Y or Z or any combination thereof.

It should be noted that the term “coupled” used herein indicates that two elements can be directly coupled to one another or coupled to one another through one or more intermediate elements.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. An apparatus for measuring a side-channel of at least one electronic device, the apparatus comprising:

a first sensor operable to generate a first measurement of a magnetic field in a first range from the side-channel of the at least one electronic device, the first range comprising a minimum threshold, the first sensor being positioned proximal to the side-channel;

a second sensor connected in series with the first sensor, the second sensor operable to generate a second measurement of the magnetic field in a second range from the side-channel of the at least one electronic device, at least a portion of the second range being less than the minimum threshold of the first range, a version of the side-channel being routed through the second sensor, wherein the version of the side-channel comprises a current having an amplitude less than a maximum current limit of the second sensor, the version of the side-channel routed through the second sensor is the same current as the side-channel current that produces the magnetic field measured by the first sensor; and a combiner connected to the first sensor and the second sensor for generating a composite measurement of the magnetic field from the side-channel of the at least one electronic device based on the first measurement and the second measurement;

the combiner further configured to:

determine whether the composite measurement matches an expected trace for the side-channel of the at least one electronic device;

generate a notification when the composite measurement does not match the expected trace for the side-channel of the at least one electronic device.

2. The apparatus of claim 1, wherein:

the first sensor comprises a non-strapping sensor that measures magnetic fields from a source external to the first sensor; and the second sensor comprises a strapping sensor that measures magnetic fields from a source that passes through the second sensor.

3. The apparatus of claim 1, wherein the second sensor has a higher resolution than the first sensor.

4. The apparatus of claim 1, further comprising a shunt device connected in parallel with the second sensor for generating the version of the side-channel being routed through the second sensor, the version of the side-channel comprising a current-limited version of the side-channel.

5. The apparatus of claim 4, wherein the shunt device comprises a diode and a resistor.

6. The apparatus of claim 1, further comprising an amplifying converter connected to the side-channel for generating the version of the side-channel being routed through the second sensor, the version of the side-channel comprising a voltage-amplified version of the side-channel.

7. The apparatus of claim 6, wherein the amplifying converter comprises a current-to-voltage amplifier connected to the side channel, a voltage limiter connected to an output of the current-to-voltage amplifier, and a resistor connected to the voltage limiter.

8. The apparatus of claim 6, further comprising a third sensor connected in series with the first sensor and the second sensor, the third sensor being operable to generate a third measurement of the magnetic field in a third range from the side-channel of the at least one electronic device, at least a portion of the third range being less than the minimum threshold of the first range, a second version of the side-channel being routed through the third sensor; the combiner being further connected to the third sensor; and the composite measurement being further generated based on the third measurement.

9. The apparatus of claim 8, wherein the third sensor comprises a strapping sensor that measures magnetic fields from a source external to the third sensor.

10. The apparatus of claim 8, wherein the third sensor has a higher resolution than the first sensor.

11. The apparatus of claim 8, wherein the third range and the second range are same.

12. The apparatus of claim 8, wherein the second version of the side-channel comprises a portion of the version of the side-channel.

13. The apparatus of claim 8, further comprising a DC block filter connected to the amplifying converter for generating the second version of the side-channel being routed through the third sensor.

14. The apparatus of claim 1, further comprising:

a first converter connected to the first sensor for digitizing the first measurement to provide a digitized first measurement; and a second converter connected to the second sensor for digitizing the second measurement to provide a digitized second measurement;

wherein the combiner generates the composite measurement based on the digitized first measurement and the digitized second measurement.

15. The apparatus of claim 1, wherein the combiner comprises a selector for outputting either the first measurement or the second measurement based on a comparison of one or more of the first measurement or the second measurement with a pre-determined threshold.

16. The apparatus of claim 1, wherein the combiner superimposes the first measurement and the second measurement.

17. The apparatus of claim 1, wherein the side-channel of the at least one electronic device comprises a power connector of the at least one electronic device.

18. A method of measuring a side-channel of at least one electronic device, the method comprising:

obtaining, by a first sensor, a first measurement of a magnetic field in a first range from the side-channel of the at least one electronic device, the first range comprising a minimum threshold;

generating a version of the side-channel;

obtaining, by a second sensor, a second measurement of the magnetic field in a second range from the version of the side-channel, at least a portion of the second range being less than the minimum threshold of the first range, wherein the second sensor is connected in series with the first sensor, and wherein a version of the side-channel is routed through the second sensor, wherein the version of the side-channel comprises a current having an amplitude less than a maximum current limit of the second sensor, the version of the side-channel routed through the second sensor is the same current as the side-channel current that produces the magnetic field measured by the first sensor;

generating a composite measurement of the magnetic field from the side-channel of the at least one electronic device based on the first measurement and the second measurement;

determining whether the composite measurement matches an expected trace for the side-channel of the at least one electronic device; and generating a notification when the composite measurement does not match the expected trace for the side-channel of the at least one electronic device.

19. The method of claim 18 comprises:

positioning a non-strapping sensor proximal to the side-channel to obtain the first measurement; and routing the version of the side-channel through a strapping sensor to obtain the second measurement.

* * * * *